Figure 1:
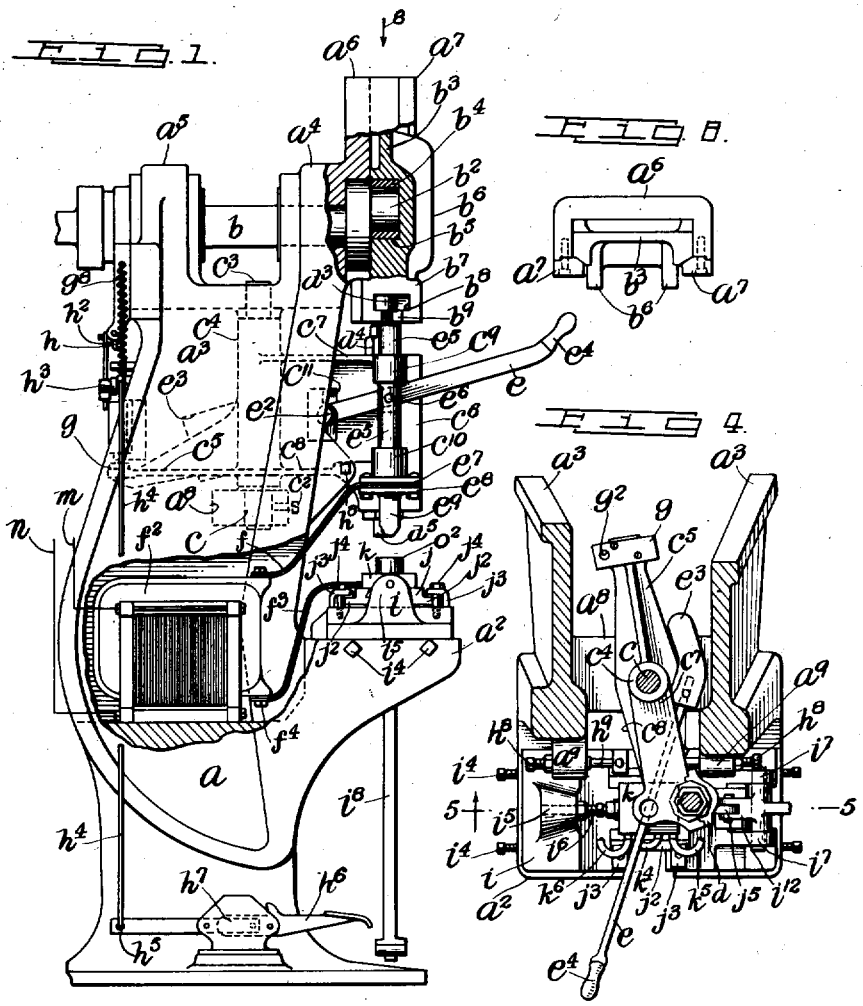

F. P. KOBERT.

ELECTRIC RIVETING APPARATUS.

APPLICATION FILED JUNE 23, 1916.

Reissued June 19, 1917.

14,319.

3 SHEETS—SHEET 1.

Inventor
Frank P. Kobert,
By his Attorneys
Edgar Tate & Co.

F. P. KOBERT.

ELECTRIC RIVETING APPARATUS.

APPLICATION FILED JUNE 23, 1916.

Reissued June 19, 1917.

14,319.

3 SHEETS—SHEET 2.

Inventor
Frank P. Kobert

By his Attorneys
Edgar Tate & Co.

F. P. KOBERT.

ELECTRIC RIVETING APPARATUS.

APPLICATION FILED JUNE 23, 1916.

Reissued June 19, 1917.

14,319.

3 SHEETS—SHEET 3.

Inventor
Frank P. Kobert

By his Attorneys
Edgar Tate & Co.

UNITED STATES PATENT OFFICE.

FRANK P. KOBERT, OF AMITYVILLE, NEW YORK, ASSIGNOR TO INTERNATIONAL ELECTRIC RIVETER COMPANY, A CORPORATION OF MASSACHUSETTS.

ELECTRIC RIVETING APPARATUS.

14,319. Specification of Reissued Letters Patent. Reissued June 19, 1917.

Original application filed January 5, 1914, Serial No. 810,278. Renewed October 7, 1914, Serial No. 865,590. Original No. 1,139,300, dated May 11, 1915. Application for reissue filed June 23, 1916. Serial No. 105,336.

*To all whom it may concern:*

Be it known that I, FRANK P. KOBERT, a citizen of the United States, and residing at Amityville, in the county of Suffolk and State of New York, have invented certain new and useful Improvements in Electric Riveting Apparatus, of which the following is a specification, such as will enable those skilled in the art to which it appertains to make and use the same.

This invention relates to apparatus for use in electric riveting, and the object thereof is to provide an improved apparatus of this class which is simple in construction and convenient of operation, and which may be easily manipulated by any one having a knowledge of this class of apparatus; a further object being to provide an apparatus of the class specified, which involves the principles, construction and operation of a power press, modified in order to adapt it to the object and uses of this invention, and with these and other objects in view the invention consists in an apparatus of the class specified constructed as hereinafter described and claimed.

The invention is fully disclosed in the following specification, of which the accompanying drawings form a part, in which the separate parts of my improvement are designated by suitable reference characters in each of the views, and in which:—

Figure 2:
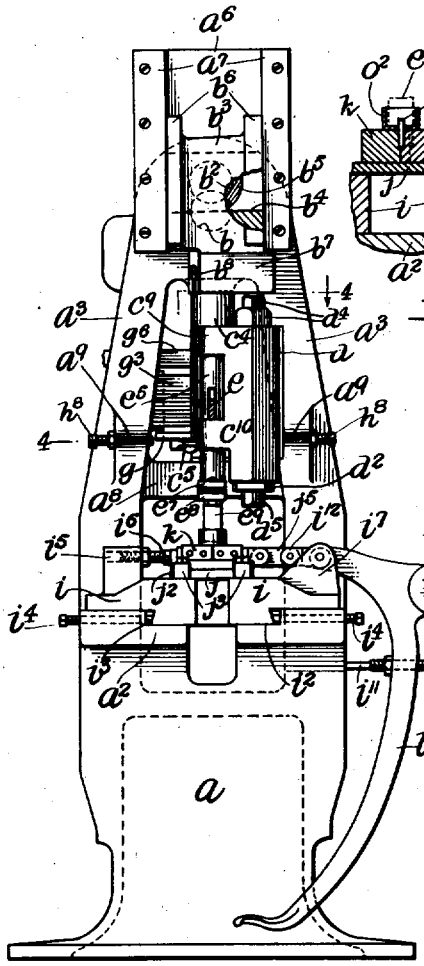
Figure 3:
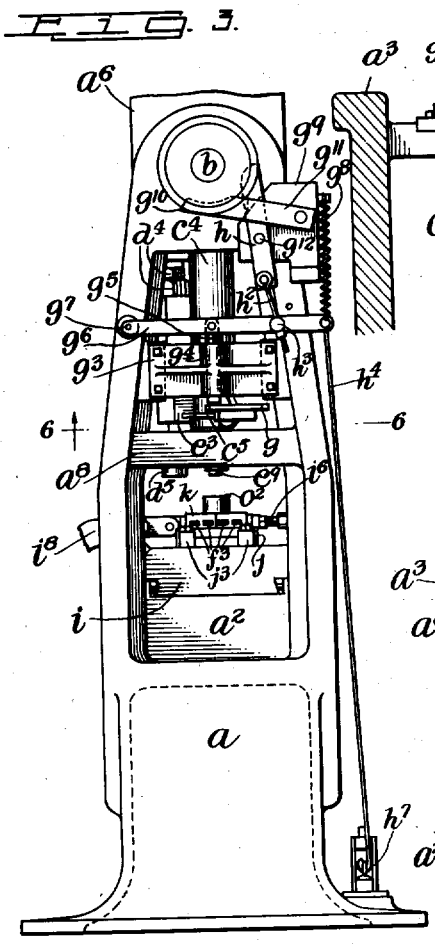

Figure 1 is a side view of an apparatus involving my invention, with part of the construction in section and part broken away;

Fig. 2 a front view of the said apparatus;

Fig. 3 a back view of the said apparatus.

Figure 5:
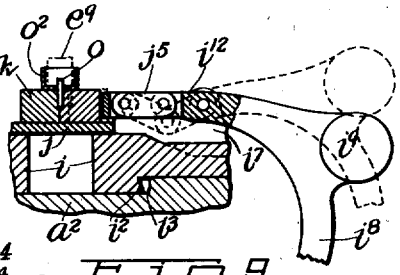
Figure 9:
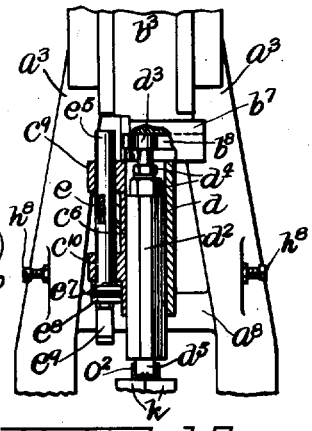
Figure 10:
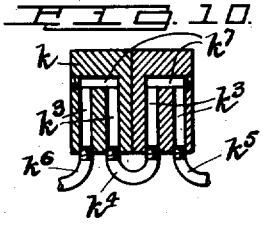
Figure 6:
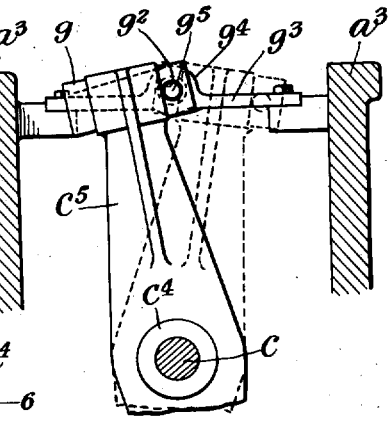
Figure 7:
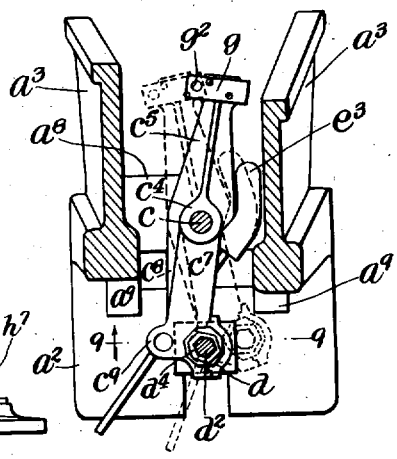

Fig. 4 a section on the line 4—4 of Fig. 2;

Fig. 5 a partial section on the line 5—5 of Fig. 4;

Fig. 6 a partial section on the line 6—6 of Fig. 3;

Fig. 7 a view similar to Fig. 4 but omitting parts of the apparatus, and showing other parts in different positions;

Fig. 8 a plan view of a part of the top portion of the apparatus indicated by the arrow 8 of Fig. 1;

Fig. 9 a partial section on the line 9—9 of Fig. 7, and;

Fig. 10 a horizontal sectional view through a two-part die which I employ, and showing the means for circulating water therethrough in order to cool said die.

In the practice of my invention, I provide a power press frame comprising a base $a$ of any suitable form or construction, and having a forwardly directed table member $a^2$ at the opposite sides of which are upright members $a^3$ at the top of which are front and back bearings $a^4$ and $a^5$ in which is mounted the usual shaft $b$ provided at its front end with a crank $b^2$. The bearing $a^4$ is provided with a front raised rectangular head $a^6$ to which are secured vertical side keepers $a^7$, and mounted in said head and held in place by said keepers, is a vertically movable slide $b^3$, and the slide $b^3$ is provided with an elongated bearing chamber $b^4$ in which the crank $b^2$ of the shaft $b$ operates, and said bearing chamber is provided with an anti-friction bushing $b^5$. The slide $b^3$ is also provided, in the construction shown, with parallel ribs $b^6$, and said slide is also provided at its lower end with an oblong head $b^7$ which is set at an angle to the front of the machine and provided with a central transverse chamber $b^8$ open at both ends.

The main frame of the machine is also provided above the table $a^2$ with a transverse support $a^8$, and mounted centrally of said support is a vertical shaft $c$, secured in said support by a set screw $c^2$ and provided in the top of the main frame with a bearing $c^3$, and mounted on the shaft $c$ is a rotary sleeve $c^4$ provided with a backwardly directed arm $c^5$, and with a forwardly directed plate $c^6$ provided with reinforcing top and bottom flange members $c^7$ and $c^8$ and the plate $c^6$ is provided with vertically arranged bearings $c^9$ and $c^{10}$, and on the left side of the front edge portion thereof, and on the right side of the front edge portion of said plate is a vertically arranged split bearing $d$ extending from the top to the bottom of said plate and angular in cross section, and in which is mounted an angular plunger $d^2$ provided at its upper end with a head $d^3$ movable in the chamber $b^8$ in the head $b^7$ of the slide $b^3$, and in the bottom of said head $b^7$ is a slot $b^9$ adapted to receive the neck of the plunger $d^2$.

The neck of the plunger $d^2$ is provided, above the bearing $d$ with adjusting and locking nuts $d^4$, and the lower end $d^5$ of the plunger $d^2$ extends below said bearing and forms the punch or riveter of the machine.

The plate $c^6$ is provided with a vertical central slot or aperture $c^{11}$ through which passes an arm $e$ pivoted to said plate at $e^2$, and said arm passes diagonally through said plate and is provided at its inner or rear end with a weight $e^3$, and said arm extends forwardly of the machine and is provided with a handle $e^4$.

A pin $e^5$ is mounted in the bearings $c^9$ and $c^{10}$ and movable vertically therethrough or therein, and said pin is pivoted to the arm $e$ at $e^6$, and the lower end of the pin $e^5$ is provided with a flat head $e^7$ to the bottom of which is secured a plate $e^8$ provided centrally with a depending electrode $e^9$, it being understood that the plate $e^8$ forms a part of said electrode, and secured between the head $e^7$ and the plate $e^8$ is a copper conductor $f$ which is connected with an electrical transformer $f^2$ supported in the framework of the machine, and rearwardly of the table $a^2$.

Secured on the rear end of the arm $c^5$ is a plate $g$, a top plan view of which is given in Figs. 4 and 7, and a bottom plan view in Fig. 6, and said plate is provided in one end with an aperture $g^2$.

A cross plate $g^3$ is secured transversely of the frame of the machine at the back thereof and above the support $a^8$, as shown in Fig. 3, and this plate is provided with a central vertical bearing $g^4$ through which is passed a vertically movable pin $g^5$ pivoted to an arm $g^6$ which is pivoted to one side of the frame at $g^7$, and extends transversely of the back thereof, and the other end of the arm $g^6$ is provided with a spring $g^8$ secured to a support $g^9$ at the top of the frame.

The rear end of the shaft $b$ is provided with a brake device $g^{10}$ comprising a drum and a brake lever $g^{11}$, and pivoted at $g^{12}$ is a brake release arm $h$ provided at its lower end with a pivoted pin $h^2$ connected with the arm $g^6$ at $h^3$, and connected with the free end of the arm $g^6$ is a rod $h^4$ which extends downwardly to the base of the frame and is connected at $h^5$ to a foot lever device $h^6$ secured at $h^7$ in the usual or any preferred manner.

The pin $g^5$ passes entirely through the bearing $g^4$, and the lower end thereof is adapted to enter the aperture $g^2$ in the plate $g$, when the arm $c^5$ is in the position shown in full lines in Figs. 6 and 7.

The sleeve $c^4$, the arm $c^5$ and the forwardly directed plate $c^6$ connected with said sleeve, form a central rotary member, and the sides $a^3$ of the frame are provided at the front thereof, and in the plane of the bottom of the plate $c^6$ or the bottom flange $c^8$ thereof with forwardly directed bearings $a^9$, and mounted horizontally in said bearings are transversely adjustable bolts or screws $h^8$, the inner end portions $h^9$ of which form stops to limit the swing of the said rotary member, in which operation the bottom of the plate $g^6$, or the flange $c^8$ thereof comes in connection with said stops.

Mounted on the table $a^2$ is a die bed $i$ which is movable forwardly and backwardly on said table, and adjustable into different positions, and said die bed is provided on the bottom thereof with a tongue portion $i^2$ movable in a corresponding groove construction $i^3$ in the table member, and in which it is held by set screws $i^4$. The die bed $i$ is provided at one side with a raised bearing $i^5$ in which is mounted an adjustable screw bolt $i^6$, and at the opposite side, said die bed is provided with raised ears $i^7$ between which is pivoted a curved foot lever $i^8$ provided on its upper end with a weight $i^9$, and passed through said lever below said weight is a set screw $i^{10}$, the inner end $i^{11}$ of which is adapted to bear on the side of the table $a^2$ to limit the downward and inward movement of said lever. Mounted centrally on the die bed $i$ is a die support $j$ having bottom flanges $j^2$, and the die support $j$ is secured to the die bed by means of angle-shaped clamps $j^3$ and screws or bolts $j^4$, as clearly shown in Figs. 1, 2, 3 and 4. Mounted on the die support $j$ is a two part die $k$ connected with the support by a tongue and groove construction, and the separate parts of the die $k$ are movable transversely of the support $j$ and transversely of the machine, and one part of said die is connected with the screw bolt $i^6$ and the other part of said die is connected with the lever $i^8$ by a link $j^5$. The lever $i^8$ is provided with a forked head $i^{12}$, as shown in Fig. 4, with which the link $j^5$ is connected, but the specific construction by which the separate parts of the die $k$ are moved forwardly and backwardly is immaterial, and any construction suitable for this purpose may be employed.

Copper conductors $f^3$ similar to the conductor $f$ are connected with the transformer $f^2$ at $f^4$, and with both parts of the divided die $k$, as shown in Figs. 1 and 3, and in the construction shown, four of the conductors $f^3$ are employed, two in connection with each part of the divided die. I also provide means for cooling the separate parts of the divided die $k$, and in the construction shown, this means consists in forming water circulating passages $k^3$ in said parts connected by a flexible loop-shaped tube member $k^4$ and having an inlet pipe $k^5$ and an outlet pipe $k^6$, and the circulating passages $k^3$ consist of two parallel longitudinal passages and cross passages $k^7$ by which they are connected, but my invention is not limited to the particular means employed for circulating water through the separate parts of the die, and any suitable means may be provided for this purpose, and it will be understood that the flexible loop-shaped tube $k^4$ permits the separation of the said dies in the operation of the apparatus, as hereinafter described.

The transformer $f^2$ is provided with the usual main circuit wires $m$ and $n$ by which an electric current is supplied to said transformer, and the operation of these parts will be the same as of other apparatus of this class.

I have also shown my invention as applied for use in riveting a screw, pin or bolt $o$ in a cup-shaped device $o^2$, shown in Figs. 1, 2, 3, 5 and 9, but it must be understood that the said invention is not limited to this or any other particular use, and may be employed for the purpose of forming heads on pins, bolts, or like devices, or for the purpose of riveting pins, bolts, screws or like devices in or to any article or articles.

The operation of the apparatus will be readily understood from the foregoing description, when taken in connection with the accompanying drawings and the following statement thereof. It must be understood that one part of the divided die $k$, that with which the adjusting screw or bolt $i^6$ is connected, is stationary in the operation of the apparatus, while the other part, or that with which the foot lever $i^8$ is connected is movable transversely of the frame, this movement being slight, but being regulated according to the work that is being done, or the dimensions of the work piece, screw, pin, bolt or other device, which is being headed or riveted. In this operation, the lower end of the lever $i^8$ is first moved downwardly and outwardly, which operation throws said lever and the link $j^5$ into the position shown in dotted lines in Fig. 5, and moves that part of the divided die with which said link is connected to the right. The work piece is then inserted between the parts of the die, as shown in Fig. 5, and the foot lever released, and the weight $i^9$ throws the same back into the position shown in Fig. 2, in which position, the separate parts of the die are forced together and the work piece securely held. In the normal position of the parts, the electrode $e^9$ is directly over the work piece, and at this stage of the procedure, the arm $e$ is manipulated to depress the electrode $e^9$ into contact with the head of the pin, bolt or screw $o$, as indicated in dotted lines in Fig. 5. This operation also completes the electric circuit through the conductors $f$ and $f^2$, and through the electrode and through the work piece, it being understood that the electrode $e^9$ and the die $k$, or the separate parts thereof are insulated in the usual manner, and this operation raises the work piece to a high degree of heat. The arm $e$ is now released and the weight $e^3$ returns said arm and the electrode $e^9$ to the position shown in Fig. 1. The arm $e$ is now moved to the left and this brings the central rotary member, which carries the plunger $d^2$ directly over the work piece, as shown in Figs. 7 and 9, the foot lever $h^6$ is now operated or depressed, and this moves the arm $g^6$ downwardly, and this depresses the pin $g^5$, and the lower end of said pin enters the aperture $g^2$ in the plate $g$ at the rear end of the central rotary member and this operates the release arm $h$, and the shaft $b$ is rotated, and the crank $b^2$ depresses the slide $b^3$ and this operation depresses the plunger $d^2$ and throws the riveting head or member $d^5$ of said plunger into contact with the head or end of the bolt or pin, $o$, as clearly shown in Fig. 9, and as indicated in Fig. 5. The shaft $b$ is driven in the usual manner, and the parts $g^{10}$, $g^{11}$ are intended to indicate a brake or clutch of any kind or class, and the part $h$ is the release device of the said brake or clutch, but these parts are, or may be, of the usual or any preferred construction, and form no part of my invention, the essential feature thereof being the brake or clutch release device $h$.

It will be understood that the above movement of the shaft $b$ cannot be produced except when the lower end of the pin $g^5$ enters the aperture $g^2$ in the plate $g$, which is secured to the rear end of the arm $c^5$ of the central rotary member, and this is the only function of said pin $g^5$ and plate $g$.

The above described movements complete one operation of the machine, and this operation may be repeated as often and as rapidly as desired, and at each of said operations, a new work piece may be inserted and operated upon.

It will be understood that my invention is not limited to the exact form, construction and operation of the various parts shown and described, and various changes therein and modifications thereof may be made, within the scope of the appended claims, without departing from the spirit of my invention or sacrificing its advantages, and my invention is not limited to a vertical machine, nor to the relative position and relative movement of the electrode and plunger holder, in which said electrode and plunger holder move in a horizontal plane, and my invention involves any positioning of the various parts, in which said parts may be placed in order to accomplish the result herein set out.

Having fully described my invention, what I claim as new and desire to secure by Letters Patent, is:—

1. In a machine of the class described, a frame provided with a table, a die mounted on said table and composed of separate parts, one of which is movable toward and from the other, and a horizontally rotatable member mounted in said frame and carrying a vertically movable plunger and a vertically movable electrode, each of which is adapted to be thrown into vertical line with a work piece held by the die.

2. A machine of the class described comprising a suitable frame provided with a suitably supported die consisting of two parts, one of which is movable toward and from the other, said parts being adapted to support a work piece and a horizontally rotatable member mounted in the frame and provided with a vertically movable plunger and a vertically movable electrode, each of which is adapted to be thrown into vertical line with the work piece supported by the die.

3. A machine of the class described comprising a suitable frame provided with a suitably supported die consisting of two parts, one of which is movable toward and from the other, said parts being adapted to support a work piece and a horizontally rotatable member mounted in the frame and provided with a vertically movable plunger and a vertically movable electrode, each of which is adapted to be thrown into vertical line with the work piece supported by the die, the separate parts of the die being also provided with water circulating passages.

4. In a machine of the class described, a frame provided with a die adapted to support a work piece, and a central rotary member mounted in the frame and provided with a vertically movable plunger and a vertically movable electrode, and means for rotating said member so as to throw the electrode and the plunger successively into vertical line with a work piece held by the die.

5. A machine of the class described, comprising a frame provided with a suitable die support, a die mounted on said support and adapted to hold a work piece, a rotatable member mounted in the frame above the support of the die and provided with a vertically movable plunger and a vertically movable electrode, means for turning said rotatable member so as to bring the electrode and the plunger successively into vertical line with the work piece held by the die, and for depressing the electrode, means for depressing the plunger, and means for passing an electric current through the electrode and through the die.

6. In a machine of the class described, a frame provided with a suitably supported die adapted to hold a work piece, a rotatable member mounted in said frame above the support of the die and provided with a vertically movable electrode and a vertically movable plunger, a shaft mounted in the top of the frame, means to permit the rotation of said shaft, means whereby the rotation of said shaft will depress said plunger, and means for depressing the electrode, and for turning the rotatable member so as to bring the electrode and the plunger successively into vertical line with the work piece held by the die.

7. In a machine of the class described, a frame provided with a suitably supported die adapted to hold a work piece, a rotatable member mounted in said frame above the support of the die and provided with a vertically movable electrode and a vertically movable plunger, a shaft mounted in the top of the frame, means to permit the rotation of said shaft, means whereby the rotation of said shaft will depress said plunger, and means for depressing the electrode, and for turning the rotatable member so as to bring the electrode and the plunger successively into vertical line with the work piece held by the die, said electrode and said die being in an open electric circuit which is closed by the depression of the electrode.

8. A machine of the class described, provided with a work piece holder and a horizontally movable member provided with a vertically movable electrode and a vertically movable plunger, and means for operating said horizontally movable member to bring the plunger and the electrode successively into vertical line with the work piece.

9. An electric riveting machine having a work piece holder, an electrode and plunger holder movable in a plane parallel with the work piece holder or die bed, and means for moving said electrode and plunger holder so as to bring the electrode and the plunger successively in position to operate on the work piece.

10. In a machine of the class described, the combination with a frame having a stationary work holder, of a heating electrode electrically connected with said work holder, and a metal working plunger, said electrode and plunger being movable relatively to the frame and over the work holder so as to bring them in line with the work.

11. In a machine of the class described, the combination of a frame, a work holder supported thereby, an electrode, a metal working device to operate on the work when it has been heated by contact with said electrode, said electrode and said metal working device being movable relatively to said work holder so as to bring them in line with the work, and power operated means for operating said metal working device when it is brought in line with the work.

12. In a machine of the class described, the combination of a frame, a stationary work holder thereon, an electrode, a plunger, said electrode and plunger being movable over the work holder so as to bring them alternately into line with the work, and power-operated means for operating the plunger when it is brought into line with the work.

13. In a machine of the class described, the combination of a work holder, an electrode, a metal working plunger, a movable carrier for said electrode and plunger adapted to move over the work holder so as to bring said electrode and said plunger successively into line with the work, and power-operated means for causing the descent of said plunger when it is brought into line with the work.

14. In a machine of the class described, the combination of a work holder, a swinging carrier, an electrode on the carrier, and movable in line with the work, and a working plunger on the carrier movable in line with the work.

15. In a machine of the class described, the combination of a work holder, a movable carrier mounted over the work holder, an electrode connected with said carrier, a plunger device connected with said carrier, means for causing the descent of the electrode on the work, and means for causing the descent of said plunger device on the work.

16. In a metal working machine of the class described, the combination of a stationary work holder, a member movable parallel therewith, a vertically movable electrode carried by said member, and a vertically movable plunger carried by said member, said member being mounted to move said electrode and said plunger successively into line with the work.

17. In a metal working machine of the class described, the combination of a die member composed of separate parts having coöperating recesses forming a socket to receive a work piece, a source of electric current, a conductor connecting said source with each of said die members, a movable electrode connected with said source of current and adapted to contact with a portion of the work piece held between said die members so as to close the circuit and thereby heat a portion of the work piece to high temperature, and means for forming the heated portion of the work piece.

18. In a metal working machine of the class described, the combination of separate die members adapted to clamp a work piece between them with one portion thereof protruding, a source of electric current, separate means for connecting said current source with each of said die members, and a movable electrode connected with said current source and adapted to make contact with the protruding end of the work piece so as to close the circuit and thereby heat said protruding end of the work piece.

19. In a metal working machine of the class described, the combination of separate die members adapted to clamp a work piece between them with one end thereof protruding, a source of electric current, separate means for connecting said current source with each of said die members, a movable electrode connected with said current source and adapted to make contact with the protruding end of the work piece so as to close the circuit and thereby heat said protruding end, and means for cooling the die members.

20. In a metal working machine of the class described, the combination of separate die members adapted to clamp a rod-like work piece between them with one end thereof protruding, a source of electric current, means for connecting said current source with each of said die members, a movable electrode connected with said current source and adapted to make contact with the protruding end of the work piece so as to close the circuit and thereby heat said protruding end, and means for cooling the die members.

21. In a metal working machine of the class described, the combination of separate die members adapted to clamp and hold a work piece between them, conductors connected with said die members, a source of current connected with said conductors, and a movable electrode in circuit with said current source and adapted to make contact with the work piece.

22. In a machine of the class described, the combination of a pair of die members, one of said members being movable relatively to the other so as to clamp a work piece between them, a source of current directly connected with both of said members, and an electrode connected with said current source and adapted to close the circuit by contact with the work piece.

23. In a machine of the class described, the combination of a pair of die members, an electrode, and a metal working plunger, said parts being relatively movable to bring the electrode and the plunger successively into line with a work piece.

24. In a machine of the class described, the combination of a work piece holder adjustable in two directions, and an electrode and plunger device adapted to coöperate successively with said work holder and to operate on the work piece held thereby.

25. In a machine of the class described, the combination of a work piece holder, an electrode, and a plunger device, said parts being relatively movable so that the electrode and plunger device may act successively on the work piece held by said holder.

26. In a machine of the class described, a pair of die members adapted to clamp a work piece therebetween with one end of the work piece protruding, a source of current, means for connecting said current source with said die members, and an electrode connected with said current source and adapted to complete the circuit by contact with the protruding end of the work piece so as to heat said protruding end, said electrode and die members being relatively movable in substantially parallel planes.

27. In a machine of the class described, a frame provided with a table, a die bed mounted on said table and adjustable forwardly and backwardly, a die supporting plate mounted on the die bed, and a two-part die mounted on said plate and one part of which is movable toward and from the other, the said parts of the die being provided in their adjacent faces with means for supporting a work piece, and conductors in electrical connection with the separate parts of the die.

28. In a machine of the class described, a frame provided with a table, a die bed mounted on said table and adjustable forwardly and backwardly, a die supporting plate mounted on the die bed, and a two-part die mounted on said plate and one part of which is movable toward and from the other, the said parts of the die being provided in their adjacent faces with means for supporting a work piece, conductors in electrical connection with the separate parts of the die, and means for cooling said parts of the die.

29. In a metal working machine, the combination of a work holder, a swinging carrier, an electrode on the carrier movable into line with the work, and a working plunger on the carrier movable into line with the work, substantially as described.

30. In a machine of the class described, the combination of a slideway, an adjustable support mounted in said slideway, die members carried by said support and adapted to clamp a workpiece between them, means for supplying a heating current to said die members, means for cooling said die members, and a movable electrode to make contact with a workpiece held between said die members.

In testimony that I claim the foregoing as my invention I have signed my name in presence of the subscribing witnesses this 21st day of June, 1916.

FRANK P. KOBERT.

Witnesses:
C. E. MULREANY,
H. E. THOMPSON.